United States Patent
Hamdoon et al.

(10) Patent No.: US 10,518,615 B2
(45) Date of Patent: Dec. 31, 2019

(54) UPPER REINFORCEMENT FOR A DOOR TRIM PANEL AND METHOD OF TUNING PERFORMANCE CHARACTERISTICS THEREOF

(71) Applicant: FORD GLOBAL TECHNOLOGIES, LLC, Dearborn, MI (US)

(72) Inventors: Muhsin M. Hamdoon, Windsor (CA); Marwan Ahmad Elbkaily, Canton, MI (US); George David Aucott, Novi, MI (US); Amit Chakravarty, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/926,789

(22) Filed: Mar. 20, 2018

(65) Prior Publication Data
US 2019/0291545 A1    Sep. 26, 2019

(51) Int. Cl.
*B60J 5/04* (2006.01)
*B60R 13/02* (2006.01)

(52) U.S. Cl.
CPC ............ *B60J 5/0461* (2013.01); *B60J 5/0426* (2013.01); *B60J 5/0451* (2013.01); *B60J 5/0413* (2013.01); *B60R 13/0243* (2013.01)

(58) Field of Classification Search
CPC .......... B60R 2021/0414; B60R 13/0243; B60J 5/0461; B60J 5/0426; B60J 5/0451; B60J 5/0413
USPC .................................................... 296/187.12
See application file for complete search history.

(56) References Cited

U.S. PATENT DOCUMENTS

| | | | |
|---|---|---|---|
| 5,171,058 A | 12/1992 | Ishikawa | |
| 5,433,478 A | 7/1995 | Naruse | |
| 5,707,098 A * | 1/1998 | Uchida | B60J 5/0426 296/146.6 |
| 5,795,013 A * | 8/1998 | Keller | B60R 13/02 280/751 |
| 5,820,191 A * | 10/1998 | Blakewood, Jr. | B60J 5/0413 296/37.13 |
| 6,039,387 A | 3/2000 | Choi | |
| 6,264,238 B1 * | 7/2001 | MacDonald | B60R 21/04 280/751 |

(Continued)

FOREIGN PATENT DOCUMENTS

| | | |
|---|---|---|
| CN | 101412360 A | 4/2009 |
| FR | 2928871 A1 | 9/2009 |

(Continued)

OTHER PUBLICATIONS

English Machine Translation of JP2008149760A.
(Continued)

*Primary Examiner* — Pinel E Romain
(74) *Attorney, Agent, or Firm* — Vichit Chea; King & Schickli, PLLC

(57) ABSTRACT

An upper reinforcement for a door trim panel includes a reinforcement channel, softening features within reinforcement channel, a tab depending from the reinforcement channel, and a trigger feature between the reinforcement channel and the tab whereby the reinforcement channel is released from the tab during a side impact. A method of tuning performance characteristics of the upper reinforcement is also described.

20 Claims, 6 Drawing Sheets

(56) References Cited

U.S. PATENT DOCUMENTS

| | | | |
|---|---|---|---|
| 6,557,929 B2 * | 5/2003 | Fox | B60R 21/04 |
| | | | 280/751 |
| 6,991,279 B2 | 1/2006 | Sweers et al. | |
| 7,204,545 B2 * | 4/2007 | Roux | B60R 21/34 |
| | | | 296/187.04 |
| 7,490,851 B2 | 2/2009 | Riester et al. | |
| 7,677,640 B2 | 3/2010 | Dix et al. | |
| 7,794,009 B2 * | 9/2010 | Pinkerton | B60N 2/4235 |
| | | | 296/153 |
| 8,029,041 B2 * | 10/2011 | Hall | B60J 5/0451 |
| | | | 296/146.6 |
| 8,960,774 B2 * | 2/2015 | Sakhare | B62D 25/02 |
| | | | 280/748 |
| 9,266,489 B2 * | 2/2016 | Smith | B60R 21/0428 |
| 2015/0298637 A1 | 10/2015 | Hase et al. | |
| 2018/0036970 A1 * | 2/2018 | Chmielewski | B29C 70/52 |
| 2018/0257596 A1 * | 9/2018 | Migaki | B60R 21/0428 |

FOREIGN PATENT DOCUMENTS

| | | |
|---|---|---|
| FR | 2979608 A1 | 3/2013 |
| JP | 2005254872 A | 9/2005 |
| JP | 2008149760 A | 7/2008 |
| KR | 2007065027 A | 6/2007 |

OTHER PUBLICATIONS

English Machine Translation of CN101412360A.
English Machine Translation of KR2007065027A.
English Machine Translation of FR2928871A1.
English Machine Translation of FR2979608A1.
English Machine Translation of JP2005254872A.

* cited by examiner

UPPER REINFORCEMENT FOR A DOOR TRIM PANEL AND METHOD OF TUNING PERFORMANCE CHARACTERISTICS THEREOF

TECHNICAL FIELD

This document relates generally to the motor vehicle equipment field and, more particularly, to a new and improved upper reinforcement for a door trim panel as well as to a method of tuning the performance characteristics of that upper reinforcement.

BACKGROUND

One of the challenges facing crash safety and interior engineers is how to provide a door trim with sufficient structural stiffness for everyday use while also providing the necessary softness to reduce load upon a motor vehicle occupant's thorax ribs in the event of a side impact. This document relates to a new and improved upper reinforcement for a door trim panel that allows the engineer to tune the performance characteristics thereof to meet these seemingly conflicting requirements.

SUMMARY

In accordance with the purposes and benefits described herein an upper reinforcement is provided for a door trim panel. That upper reinforcement comprises a body having a reinforcement channel, a tab depending from that reinforcement channel and a trigger feature between the reinforcement channel and the tab whereby the reinforcement channel is released from the tab during a side impact.

More particularly, the reinforcement channel may include a first corner and a second corner. A weakening feature may be provided (a) at the first corner, (b) at the second corner or (c) at the first corner and the second corner. In one or more of the many possible embodiments of the upper reinforcement, the weakening feature may extend across the second wall from the first corner to the second corner. Further, the weakening feature may comprise a cutout.

The reinforcement channel may include a first wall, a second wall and a third wall wherein the first wall is connected to the second wall at the first corner and the second wall is connected to the third wall at the second corner. The first wall, the second wall and the third wall define an open channel. A rib may extend across that open channel between the first wall and the third wall.

The rib may include a first end section that engages the first wall, a second end section that engages the third wall and an intermediate section between the first end section and the second end section. The intermediate section may have a first thickness $T_1$ that is less than a second thickness $T_2$ of the first end section and the second end section.

In one or more of the many possible embodiments of the upper reinforcement, the trigger feature may comprise at least one notch. That notch may be V-shaped. In at least one of the many possible embodiments of the upper reinforcement, the trigger feature may comprise at least two V-shaped notches and a material-weakening groove extending between those two V-shaped notches. The upper reinforcement may include a plurality of tabs depending from the reinforcement channel. All of the plurality of tabs may include a trigger feature.

In accordance with an additional aspect, a method is provided of tuning performance characteristics of an upper reinforcement for a door trim panel wherein that upper reinforcement includes a reinforcement channel and a tab depending from the reinforcement channel. That method may comprise providing a trigger feature between the reinforcement channel and the tab whereby the reinforcement channel is released from the tab during a side impact that exceeds a given predetermined force.

The method may further include the step of providing a weakening feature across a wall and at corners of the reinforcement channel. Further, the method may include using a cutout as the weakening feature and a V-shaped notch or V-shaped notch and V-groove across tab section as the trigger feature.

The method may further include the step of controlling the thickness of the walls of the reinforcement channel and the number and size of depending tabs to control the overall structural strength of the upper reinforcement. Further, the method may include providing the reinforcement channel with at least one rib. Further, the method may include providing that at least one rib with a section of reduced thickness to promote bending of the rib in the event of a side impact that exceeds a given predetermined force and thus softening of the upper reinforcement.

In the following description, there are shown and described several preferred embodiments of the upper reinforcement for a door trim panel and a related method of tuning performance characteristics of that upper reinforcement. As it should be realized, the upper reinforcement and related method are capable of other, different embodiments and their several details are capable of modification in various, obvious aspects all without departing from the upper reinforcement and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the upper reinforcement as well as the related method of tuning performance characteristics of that upper reinforcement and together with the description serve to explain certain principles thereof.

Reference will now be made in detail to the present preferred embodiments of the upper reinforcement; examples of these are illustrated in the accompanying drawing figures.

DETAILED DESCRIPTION

Figure 1:
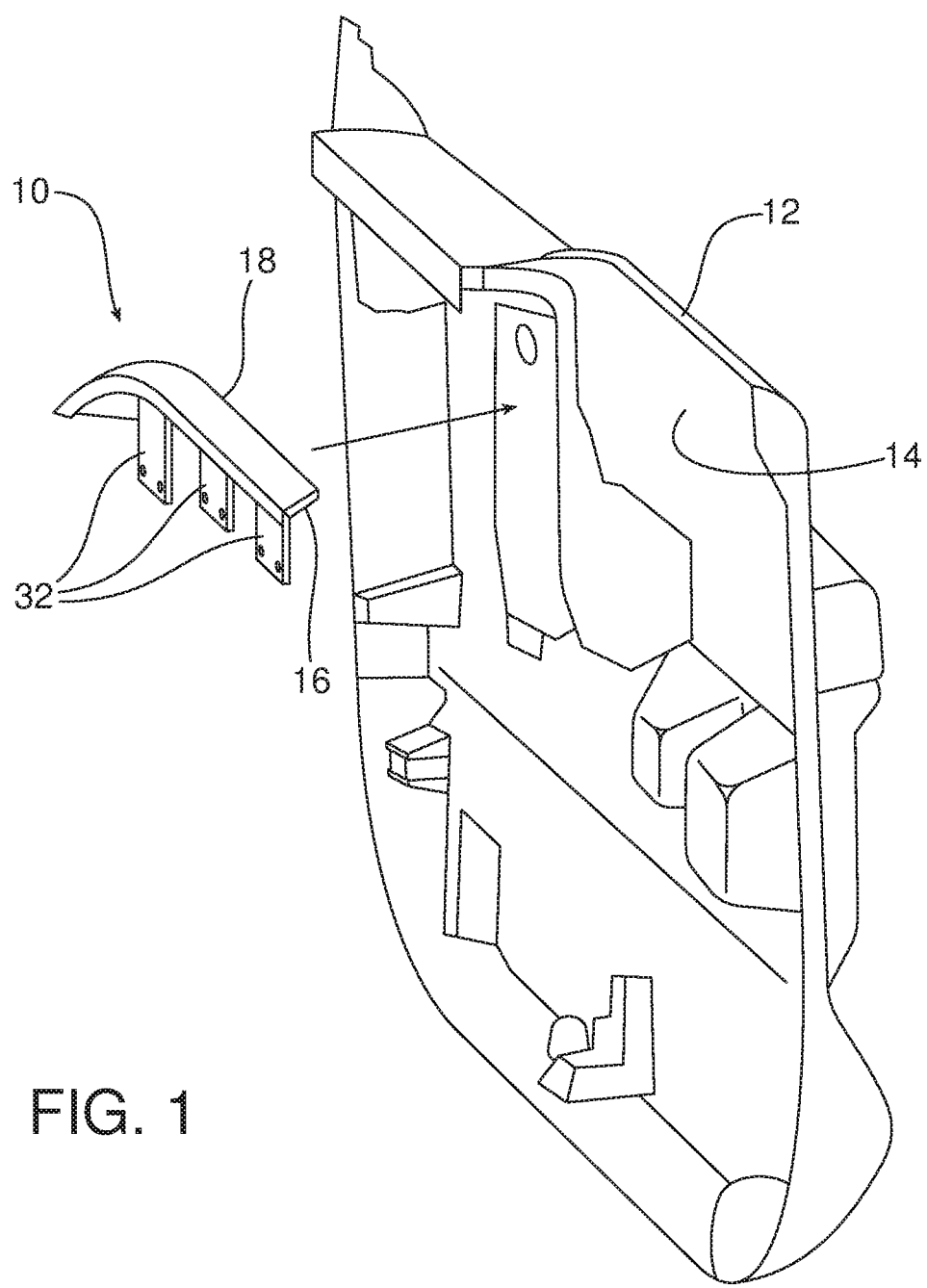
FIG. 1 is a partially exploded perspective view showing a door trim panel and an upper reinforcement that is secured to the door trim panel in order to strengthen the door trim panel.
Figure 2:
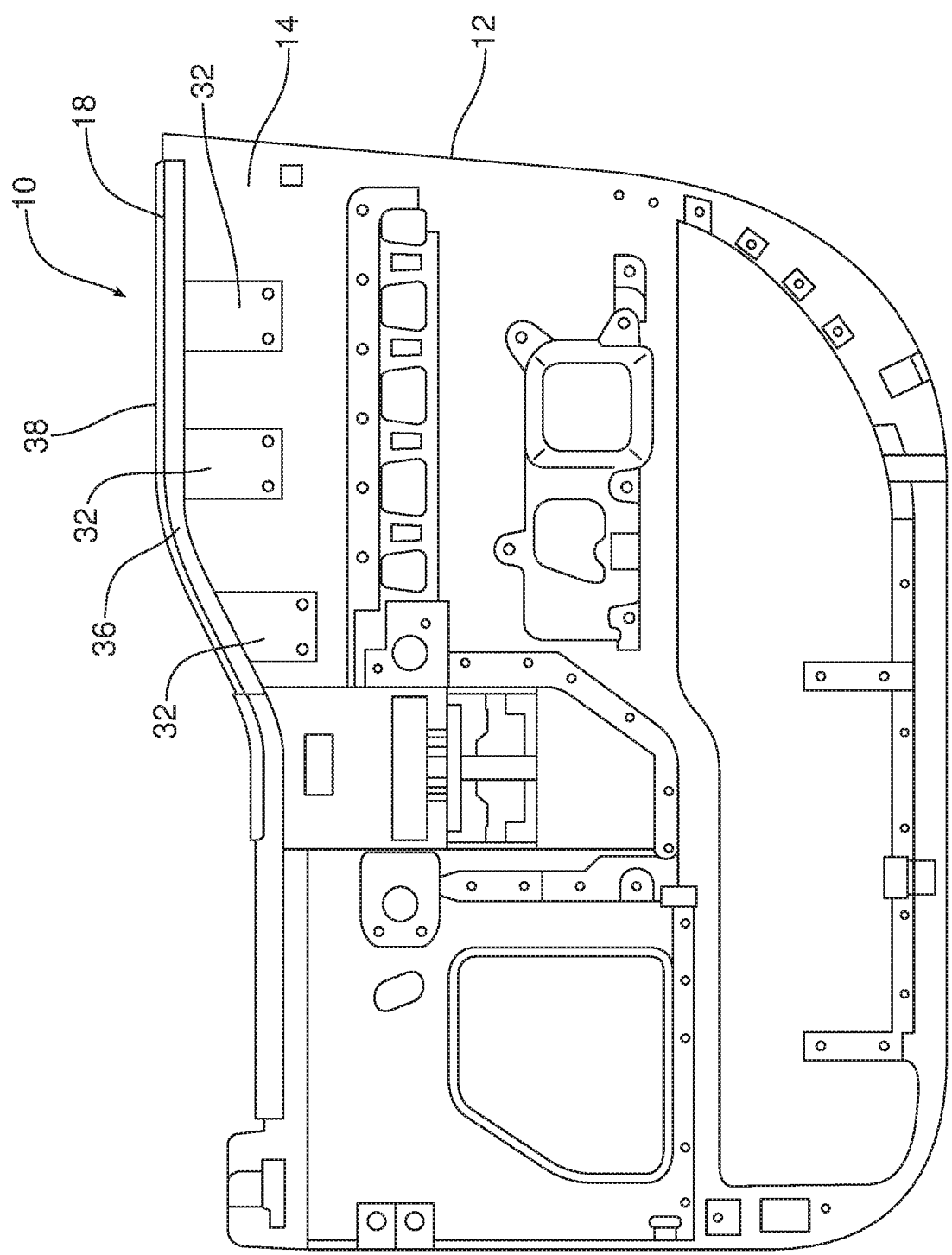
FIG. 2 is a side elevational view illustrating the upper reinforcement secured in position on the B-side of the door trim panel.

Reference is now made to FIGS. 1-5 illustrating the upper reinforcement 10 that may be utilized to increase the strength of a door trim panel 12. More particularly, as illustrated in FIGS. 1 and 2, the upper reinforcement 10 is secured to the B-face 14 along the upper edge of the door trim panel 12 to provide the necessary strength for the door trim panel 12 to function in a proper capacity over the life of the motor vehicle in which the door trim panel 12 is installed.

Figure 3:
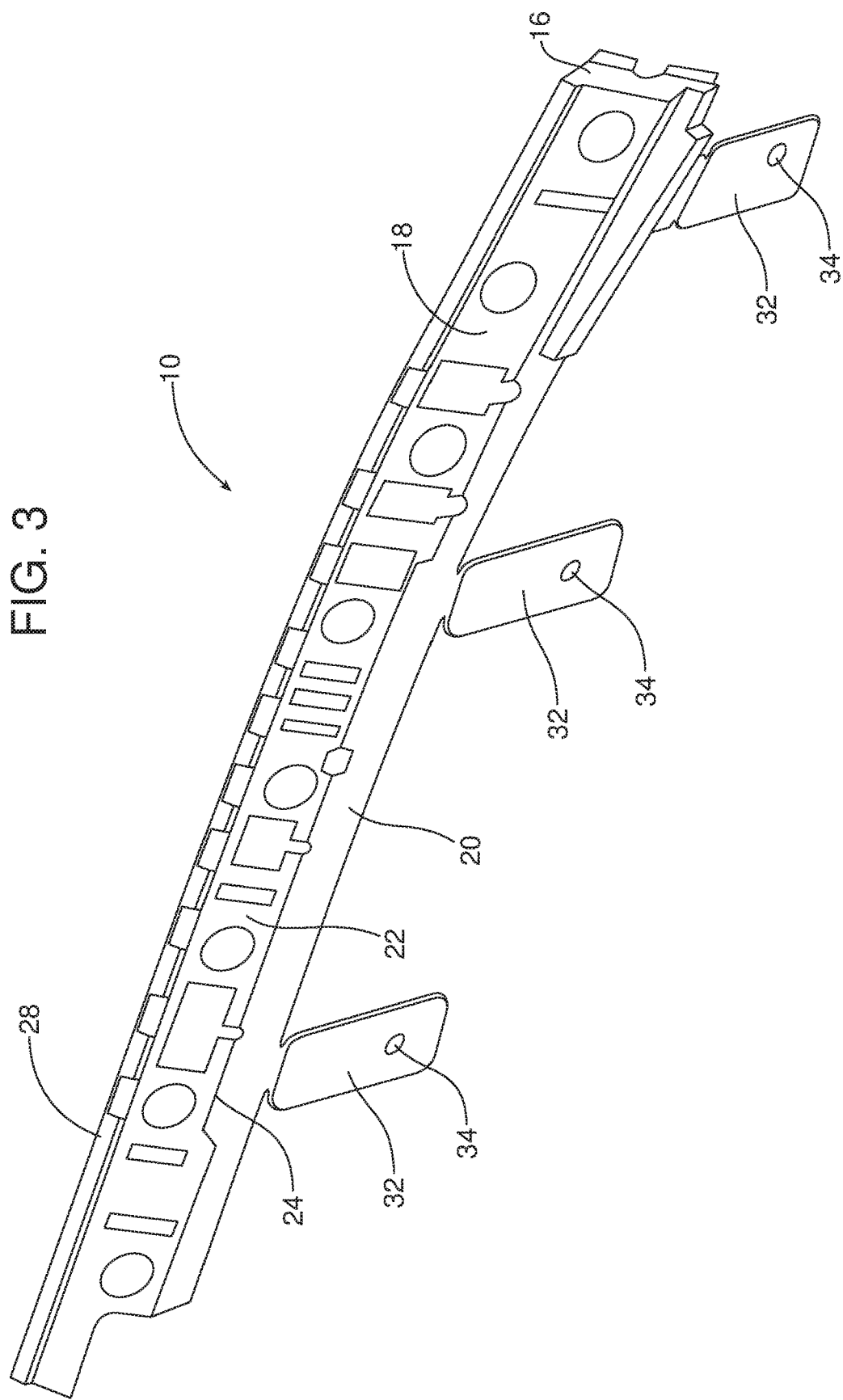
FIG. 3 is a detailed perspective view of the upper reinforcement from above illustrating the reinforcement channel, the tabs depending from the reinforcement channel, the trigger feature between the reinforcement channel and the tabs and the weakening features provided on the reinforcement channel.
Figure 4:
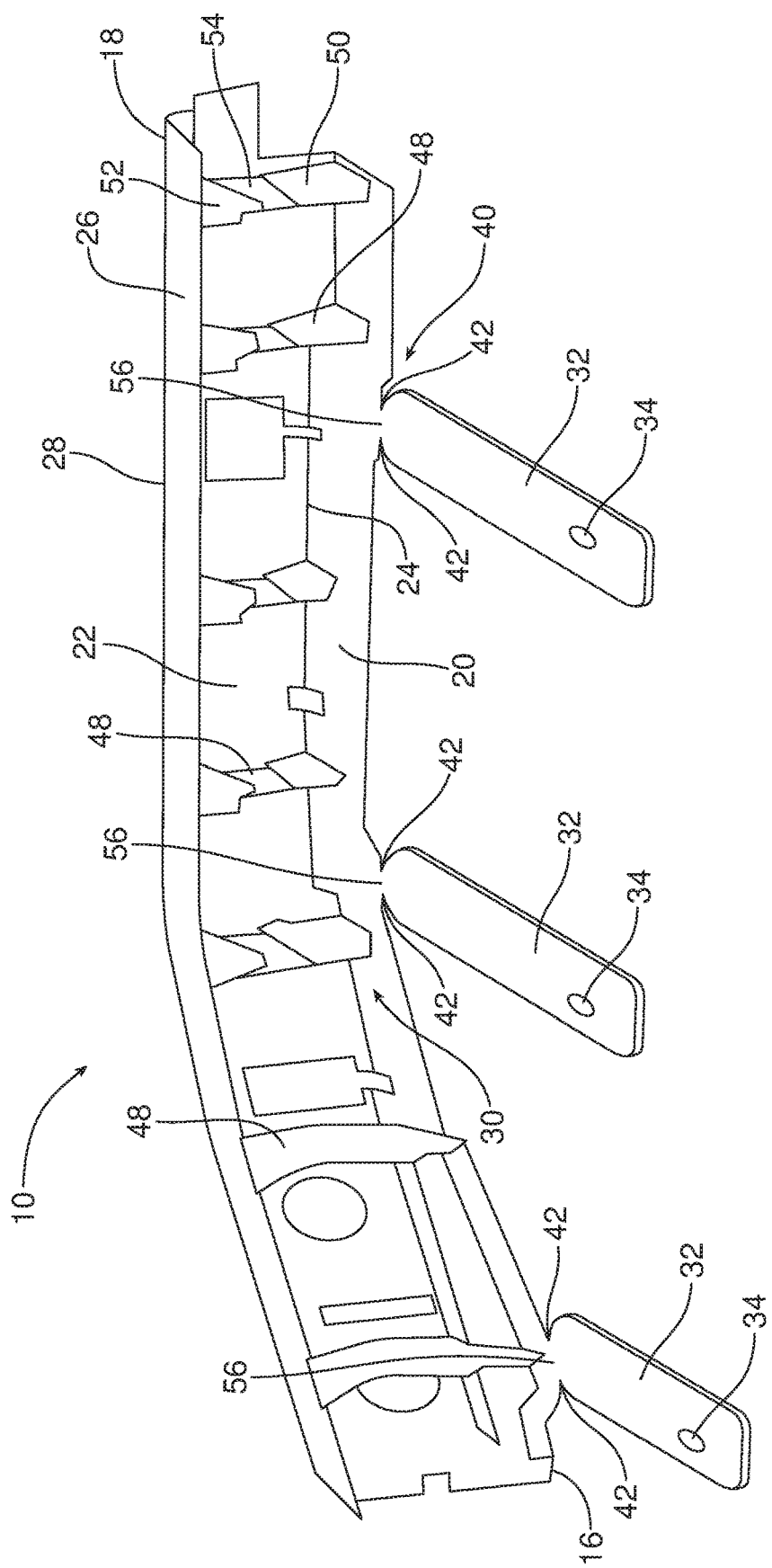
FIG. 4 is a detailed perspective view of the channel side of the reinforcement channel illustrating the ribs that extend across the open channel as well as the tabs depending from the channel and the trigger feature between the reinforcement channel and the tabs.
Figure 5:
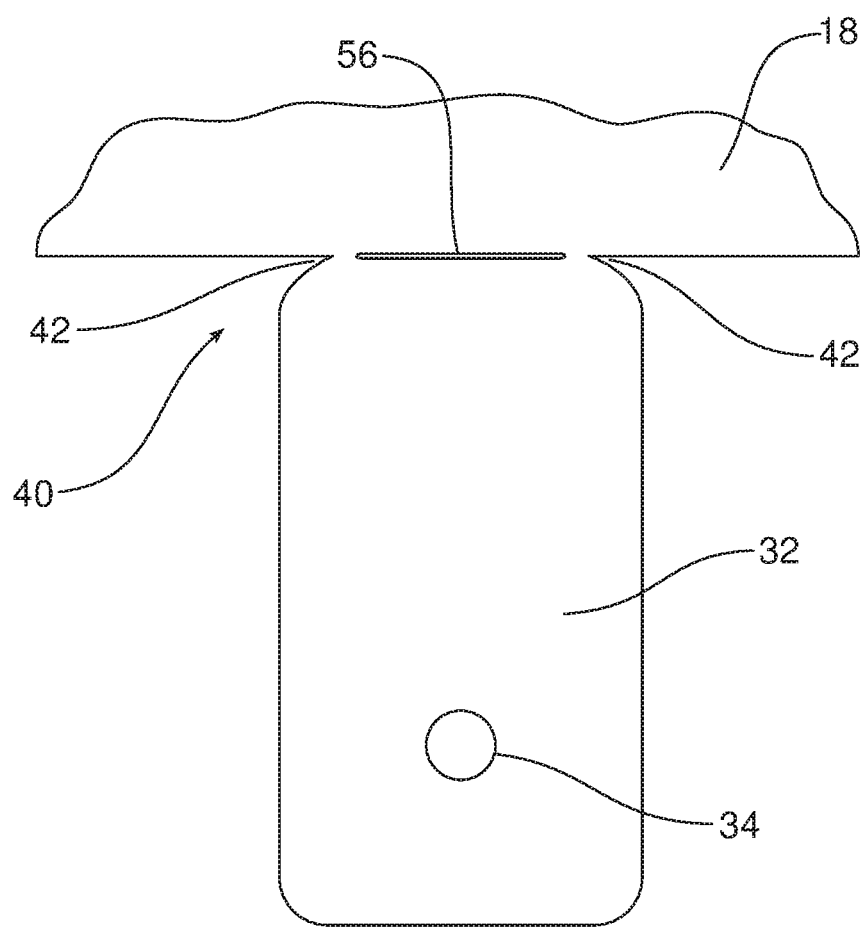
FIG. 5 is a detailed elevational view of the trigger feature provided at the intersection of each tab with the reinforcement channel of the upper reinforcement.

As best illustrated best in FIGS. 3-5, the upper reinforcement 10 comprises a unitary body 16 of polymer or other appropriate material. The unitary body 16 includes an elongated reinforcement channel 18. The reinforcement channel 18 includes a first wall 20 connected to a second wall 22 at a first corner 24 and a third wall 26 connected to the second wall at a second corner 28. As illustrated in FIG. 4, the first wall 20, the second wall 22 and the third wall 26 define an open channel generally designated by reference numeral 30. The reinforcement channel 18 may be connected by heat stake welds to the door trim panel 12.

A plurality of tabs 32 depend from the first wall 20 of the reinforcement channel 18. Each tab 32 includes a heat stake 34 for connecting the tab to the B-face 14 of the door trim panel 12. When properly seated and secured in position on the door trim panel 12, the reinforcement channel 18 nests in a curve 36 provided along the top edge 38 of the door trim panel 12 as illustrated in FIG. 2. As most clearly shown in FIG. 5, a trigger feature, generally designated by reference numeral 40, is provided between the reinforcement channel 18 and each tab 32. More particularly, in the illustrated embodiment, the trigger feature 40 comprises a pair of opposed V-shaped notches 42. In some embodiments, a single notch may be provided. In other embodiments, the notches 42 may assume a different shape.

A weakening feature, generally designated by reference numeral 44 may be provided along the reinforcement channel 18. More specifically, the weakening feature 44 in the illustrated embodiment takes the form of a cutout 46. In the illustrated embodiment, the weakening feature 44 or cutout 46 is provided at portions of the first corner 24 and at portions of the second corner 28. Further, the weakening feature 44 or cutout 46 extends across the second wall 22 from the first corner 24 to the second corner 28. In other embodiments, the weakening feature 44 or cutout 46 may be provided just at the first corner 24, just at the second corner 28 or just at both corners. The size, shape and location of the weakening feature 44 provides one means for tuning the performance characteristics of the upper reinforcement 10 in a manner described in greater detail below.

Figure 6:
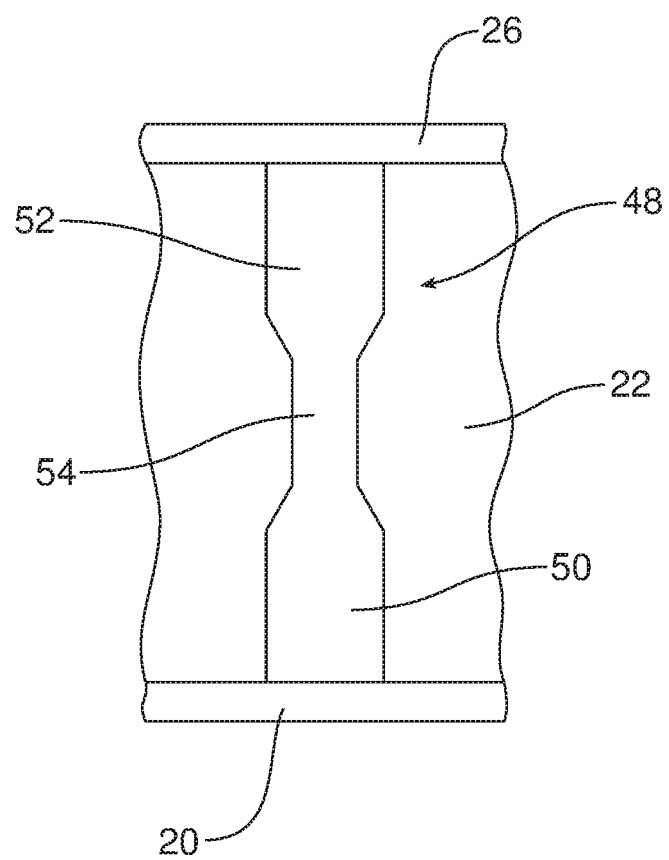
FIG. 6 is a detailed plan view of a single rib showing the intermediate section of reduced thickness to promote bending in the event of a side impact.

As best illustrated in FIGS. 4 and 6, a plurality of ribs 48 may extend across the open channel 30 between the first wall 20 and the third wall 26. Each rib 48 may include a first end section 50 engaging the first wall 20, a second end section 52 engaging the third wall 26 and an intermediate section 54 between the first end section and the second end section. In the illustrated embodiment, the intermediate section has a first thickness $T_1$ that is less than a second thickness $T_2$ of the first end section 50 and the second end section 52.

Advantageously, the performance characteristics of the upper reinforcement 10 may be turned as desired to meet strength and safety benchmarks. The method of tuning the performance characteristics of the upper reinforcement 10 includes the step of providing the trigger feature 40 between the reinforcement channel 18 and the tabs 32. More particularly, in the illustrated embodiment, the trigger feature 40 comprises two opposed V-shaped notches 42 and a material-weakening groove 56 extending across the relatively narrow strip of material there between. As a result, this relatively narrow strip of material is weaker than the adjacent reinforcement channel 18 and tab 32 thereby providing a break point that allows the reinforcement channel to tear away and be released from the tab 32 in the event of a side impact exceeding a predetermined design force. As should be appreciated, the width, length and thickness of the V-shaped notches 42 and the material-weakening groove 56 as well as the type of material defining the narrow strip enable the engineer to tune the performance characteristics of the upper reinforcement 10 so that it will tear and release in response to a side impact force that exceeds a predetermined design force.

The method also includes the step of providing the weakening feature 44 across any of the first wall 20, second wall 22 and third wall 26 in any of the first corner 24 and/or the second corner 28 of the reinforcement channel 18. In the illustrated embodiment, the greater the size and extent of the weakening feature 44/cutout 46, the greater the weakening effect and, therefore, the softening of the upper reinforcement 10 in the event of a side impact. However, very soft upper reinforcement may collapse easily, does not absorb enough energy, and bottoms out causing occupant to collide directly with metal parts of vehicle which may cause higher rib deflection. Therefore, this optimal design includes well studied softening features to ensure best performance. In some embodiments the weakening feature 44 or cutout 46 may extend across the second wall 22 between the two corners 24, 28.

As illustrated, the method includes using a cutout 46 as a weakening feature 44 and at least one V-shaped notch 42 as the trigger feature 40. Here it should be appreciated that the weakening feature 44 and the trigger feature 40 may assume other appropriate structures or configurations suited for the intended purpose of tuning the performance characteristics of the upper reinforcement 10.

In addition, the method may include the step of controlling the thickness of the first wall 20, the second wall 22 and the third wall 26 of the reinforcement channel 18 as well as the number and size (thickness, width and length) of the depending tabs 32 to control the strength of the upper reinforcement 10. Further, the method includes providing the reinforcement channel 18 with at least one rib 48 extending across the open channel 30 of the reinforcement channel 18. Further, the method includes providing the at least one rib 48 with a section (in the illustrated embodiment, the intermediate section 54) of reduced thickness to promote bending of the rib in the event of a side impact and therefore softening of the upper reinforcement 10. Thus, it should be appreciated that the number of ribs 48, the spacing of the ribs and the thickness of the ribs may all be controlled in order to further tune the performance characteristics of the upper reinforcement 10.

The foregoing has been presented for purposes of illustration and description. It is not intended to be exhaustive or to limit the embodiments to the precise form disclosed.

Obvious modifications and variations are possible in light of the above teachings. All such modifications and variations are within the scope of the appended claims when interpreted in accordance with the breadth to which they are fairly, legally and equitably entitled.

What is claimed:

1. An upper reinforcement for a door trim panel, comprising:
    a reinforcement channel;
    a tab depending from said reinforcement channel; and
    a trigger feature between said reinforcement channel and said tab whereby said reinforcement channel is released from said tab during a side impact.

2. The upper reinforcement of claim 1, wherein said reinforcement channel includes a first corner and a second corner and a weakening feature is provided (a) at said first corner, (b) at said second corner or (c) at said first corner and said second corner.

3. The upper reinforcement of claim 2, wherein said reinforcement channel includes a first wall, a second wall and a third wall wherein said first wall is connected to said second wall at said first corner and said second wall is connected to said third wall at said second corner.

4. The upper reinforcement of claim 3, wherein said first wall, said second wall and said third wall define an open channel.

5. The upper reinforcement of claim 4, further including a rib extending across said open channel between said first wall and said third wall.

6. The upper reinforcement of claim 5, wherein said rib includes a first end section engaging said first wall, a second end section engaging said third wall and an intermediate section between said first end section and said second end section, said intermediate section having a first thickness $T_1$ that is less than a second thickness $T_2$ of said first end section and said second end section.

7. The upper reinforcement of claim 6, wherein said weakening feature extends across said second wall from said first corner to said second corner.

8. The upper reinforcement of claim 7, wherein said weakening feature is a cutout.

9. The upper reinforcement of claim 7, wherein said trigger feature is at least one notch.

10. The upper reinforcement of claim 7, wherein said trigger feature is two V-shaped notches and a material weakening groove extending between said two V-shaped notches.

11. The upper reinforcement of claim 10, wherein said upper reinforcement includes a plurality of tabs depending from said reinforcement channel.

12. The upper reinforcement of claim 11, wherein all of said plurality of tabs includes said trigger feature.

13. The upper reinforcement of claim 1, wherein said reinforcement channel includes a first wall, a second wall and a third wall, wherein said first wall is connected to said second wall at a first corner and said second wall is connected to said third wall by a second corner and said first wall, said second wall and said third wall define an open channel.

14. The upper reinforcement of claim 13, further including a rib extending across said open channel between said first wall and said third wall.

15. The upper reinforcement of claim 14, wherein said rib includes a first end section engaging said first wall, a second end section engaging said third wall and an intermediate section between said first end section and said second end section, said intermediate section having a first thickness that is less than a second thickness of said first end section and said second end section.

16. A method of tuning performance characteristics of an upper reinforcement, for a door trim panel, including a reinforcement channel and a tab depending from the reinforcement channel, said method comprising:
    providing a trigger feature between said reinforcement channel and said tab whereby said reinforcement channel is released from said tab during a side impact.

17. The method of claim 16, providing a weakening feature across a wall and at corners of said reinforcement channel.

18. The method of claim 17, including using a cutout as said weakening feature and a V-shaped notch as said trigger feature.

19. The method of claim 16, including controlling thickness of walls of said reinforcement channel and number and size of depending tabs to control strength of said upper reinforcement.

20. The method of claim 16, including providing said reinforcement channel with at least one rib and providing said at least one rib with a section of reduced thickness to promote bending of said rib in event of said side impact.

* * * * *